United States Patent [19]

Ashitaka et al.

[11] Patent Number: 5,403,520
[45] Date of Patent: Apr. 4, 1995

[54] NONLINEAR OPTICAL DEVICE AND OPTICAL SIGNAL PROCESSING UNIT

[75] Inventors: Hidetomo Ashitaka; Tadahiro Yokozawa; Ryuichi Shimizu; Kazuhiro Morita, all of Ichihara, Japan

[73] Assignee: Ube Industries, Ltd., Tokyo, Japan

[21] Appl. No.: 144,215

[22] Filed: Oct. 27, 1993

Related U.S. Application Data

[63] Continuation of Ser. No. 762,938, Sep. 19, 1991, abandoned.

[30] Foreign Application Priority Data

Sep. 25, 1990 [JP] Japan .................................. 2-251934
Sep. 25, 1990 [JP] Japan .................................. 2-251935

[51] Int. Cl.$^6$ .......................... F21V 9/00; G02F 1/37
[52] U.S. Cl. ................................. 252/582; 252/585; 359/328; 359/329; 359/332
[58] Field of Search .................. 252/582, 585, 589; 359/328, 329, 332, 103

[56] References Cited

U.S. PATENT DOCUMENTS

| | | | |
|---|---|---|---|
| 4,981,614 | 1/1991 | Miyazaki et al. | 252/587 |
| 5,011,623 | 4/1991 | Yoshinaga et al. | 252/299.5 |
| 5,070,260 | 12/1991 | Wong | 359/330 |
| 5,086,239 | 2/1992 | Wang | 359/328 |
| 5,112,934 | 5/1992 | Kester et al. | 528/99 |
| 5,151,822 | 9/1992 | Hekker et al. | 359/559 |

FOREIGN PATENT DOCUMENTS 0402038 12/1990 European Pat. Off. .
0000027 1/1990 Japan .

OTHER PUBLICATIONS

Battelle, "Interim Report on Advances and Opportunities in Nonlinear Optical Materials" (1989), pp. 1–27.

*Primary Examiner*—Shean Wu
*Attorney, Agent, or Firm*—Frishauf, Holtz, Goodman & Woodward

[57] ABSTRACT

The nonlinear optical device of the present invention comprises a nonlinear optical element comprised of a chiral compound having a third-order nonlinearity. Further, the optical signal processing unit comprises a laser light source, the above-described nonlinear optical device, and a photodetector.

13 Claims, 5 Drawing Sheets

Nonlinear signal v.s. pump itensity of 4% [6] solution in THF (6) ; Hexahelicene

NONLINEAR OPTICAL DEVICE AND OPTICAL SIGNAL PROCESSING UNIT This application is a continuation of application Ser. No. 07/762,938, filed Sep. 19, 1991, now abandoned.

BACKGROUND OF THE INVENTION

1. Field of the Invention

The present invention relates to a nonlinear optical device and an optical signal processing unit for use in the fields of optoelectronics, optical information processing, optical communication, etc.

2. Description of the Prior Art

Nonlinear optical materials are materials having a nonlinear response of second or higher order in a strong electric field of a laser beam and are important to optical signal processing such as frequency conversion, oscillation and switching.

In particular, third-order nonlinear optical materials have attracted interest as a basic material in future optical communication and information processing wherein excellent characteristics inherent in light, that is, high speed and parallel processing are sufficiently exhibited.

Among the nonlinear optical materials, organic nonlinear optical materials are particularly important because some of them exhibit higher response speed and larger nonlinear optical constant than those of the conventional inorganic nonlinear optical materials.

Although the mechanism through which the third-order nonlinear optical effect is developed has not been elucidated yet, it is known, for example, that organic nonlinear optical materials having an extended delocalized $\pi$ electron system exhibit excellent third-order nonlinear characteristics.

Aromatic compounds comprising linearly linked aromatic rings are known as the organic nonlinear optical material having a delocalized $\pi$ electron system. These aromatic compounds, however, had a problem that an increase in the number of aromatic rings deteriorates the heat stability and causes the absorption wavelength of light to shift to a longer wavelength side.

A nonlinear optical device wherein use is made of a third-order nonlinear optical material utilizes a change in the refractive index caused when exposed to light.

Amplification of a minute change in the refractive index through the use of, for example, a Fabry-Perrot resonator is known as a method of reading the change in the refractive index. In this method, however, even a slight instability in the light source sensitively affects the resonance stability, which renders the whole system very delicate. Therefore, a high accuracy of dimension and quality necessary for stably operating the system poses an obstacle to the cost and mass productivity. Further, a very high energy should inevitably be applied for the purpose of increasing the change in the refractive index, which brings about problems of heat resistance of material, heat barrier, thermal effect, technical barrier associated with loading of information on the high applied energy, etc.

A proposed method for solving the above-described problem is to conduct detection with a very high sensitivity through the measurement of elliptically polarized light by means of weak probe light.

This method comprises inducing optical anisotropy in a substance with an intense pumping light to cause a change in the polarized light in a linearly polarized signal light.

In this method, in order to utilize the optically induced optical anisotropy, it is necessary to use means such as the use of a circularly polarized light as the pumping light or the inclination of the direction of polarization of the pumping light from the direction of polarization of the signal light, which limits the signal processing method.

SUMMARY OF THE INVENTION

A first object of the present invention is to solve the above-described problems and to provide a nonlinear optical device wherein various signal processing methods can be applied to read a change in the refractive index through the use of a third-order nonlinear optical material which exhibits a large third-order nonlinearity and undergoes neither thermal nor optical damage.

A second object of the present invention is to provide an optical signal processing unit wherein use is made of the above-described nonlinear optical device.

The first object of the present invention can be attained by providing a nonlinear optical device provided with a nonlinear optical element comprising a chiral compound having a third-order nonlinearity.

The second object of the present invention can be attained by providing an optical signal processing unit comprising a laser light source, a nonlinear optical device provided with a nonlinear optical element comprising a chiral compound having a third-order nonlinearity, and a photodetector.

DETAILED DESCRIPTION OF THE INVENTION

Figure 1:
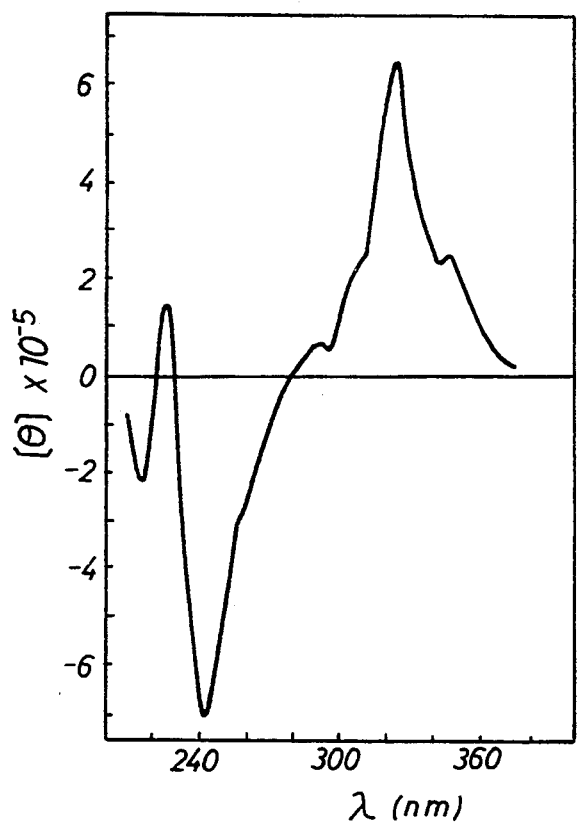
FIGS. 1 and 2 are respectively a CD spectrum and an ORD spectrum of (+)-hexahelicene.

In the present invention, the chiral compound has an extended delocalized $\pi$ electron system and preferably has large optical rotation.

Chiral compounds having a condensed aromatic ring are suitable as the chiral compound, and examples thereof include optically active helicenes and exciton chiral compounds.

Examples of the optically active helicenes include carbohelicene and heterohelicene.

The carbohelicene is a compound having a spiral structure comprising 5 or more aromatic rings, preferably 6 to 20 aromatic rings linked to each other.

The heterohelicene is a compound comprising a ring formed by cocondensation of benzene with a heterocycle such as thiophene, furan, pyridine or pyrrole.

The carbohelicene or heterohelicene may have various substituents on the aromatic ring or hetrocycle.

These carbohelicenes and heterohelicenes are described in, for example, Top. Curr. Chem. 125 (Stereochemistry), 63-130 (1984).

There is no particular limitation on the method of synthesizing the carbohelicene and heterohelicene. For example, they can he prepared through photocyclization of 1,2-diarylethylenes, bis(arylvinyl)arenes, etc., synthesized by the Wittig reaction or the Siegrist reaction.

The helicenes have a large third-order nonlinearity because they have an extended delocalized $\pi$ electron system, and are excellent as a third-order nonlinear optical material because it undergoes neither thermal nor optical damage by a laser beam.

Examples of the exciton chiral compounds include asymmetric compounds having two or more condensed aromatic chromophores comprising two or more aromatic rings, preferably 3 to 6 aromatic rings linked to each other and exhibiting a strong chiral exciton coupling.

For example, they include (6R, 15R)-(+)-6,15-dihydro-6,15-ethanonaphtho[2,3-c]pentaphene, 13,13'-spirobi[13H-indeno[1,2-b]anthracene and 1,1'-bianthryl derivatives.

These exciton chiral compounds are described in, for example, Noriyuki Harada and Koji Nakanishi, "En Nishokusei Supekutoru (Circular Dichroism Spectrum)"—Yuki Rittaikagaku eno Oyo (Application to Organic Stereochemistry)—published by Tokyo Kagaku Dozin Co., Ltd. (1982), and Shin Jikken Kagaku Koza, Vol. 13, Yuki Kozo (Organic Structure), Part II, pp. 850-879, published by Maruzen (1977).

Further, the exciton chiral compounds may have a donor, an acceptor or a $\pi$-conjugated substituent added to the condensed aromatic chromophore for the purpose of accelerating the exciton interaction or the delocalization by the $\pi$-conjugation.

The nonlinear optical device of the present invention comprises a nonlinear optical element comprised of a chiral compound having a third-order nonlinearity.

The nonlinear optical element comprising a chiral compound having a third-order nonlinearity may be in the form of, for example, a solution, a crystal or a thin film of the chiral compound, or a resin doped with the chiral compound.

The chiral compound having a third-order nonlinearity in the present invention can rotate the plane of polarization of a linearly polarized light depending upon the intensity of light. The utilization of this chiral nonlinear effect makes various optical signal processing possible.

The principle according to which the plane of polarization of the linear polarized light rotates will now be described.

Figure 2:
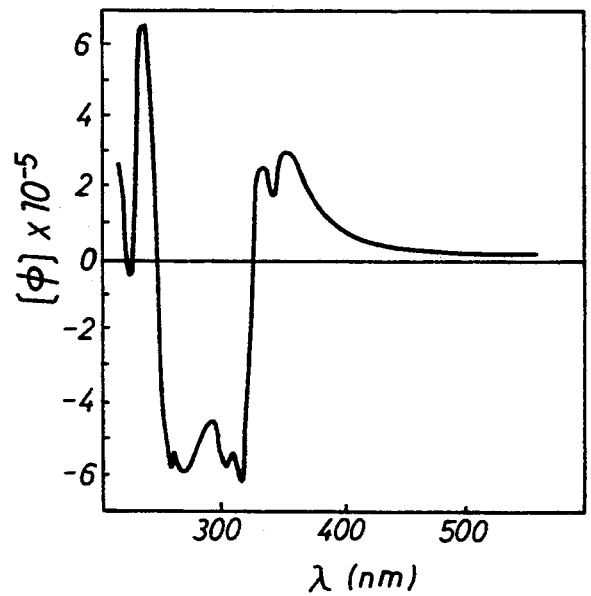
Figure 3:
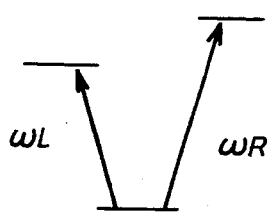
FIG. 3 a diagram showing an energy level with respect to left-handed and right-handed circularly polarized lights of a simplified model of a chiral compound.

The CD spectrum and ORD spectrum of (+)-hexahelicene which is a chiral compound having a third-order nonlinearity are shown in FIGS. 1 and 2, respectively.

In the CD spectrum, there is a positive peak around 330 nm derived from a strong absorption of a left-handed circularly polarized light (L) while there is a negative peak around 240 nm derived from a strong absorption of a right-handed circularly polarized light (R). In the ORD spectrum, the polarization is reversed around these wavelengths.

This suggests that the chiral compound, when represented by a very simplified model, has energy levels which are different from each other between the left-handed circularly polarized light and the right-handed circularly polarized light.

Figure 4:
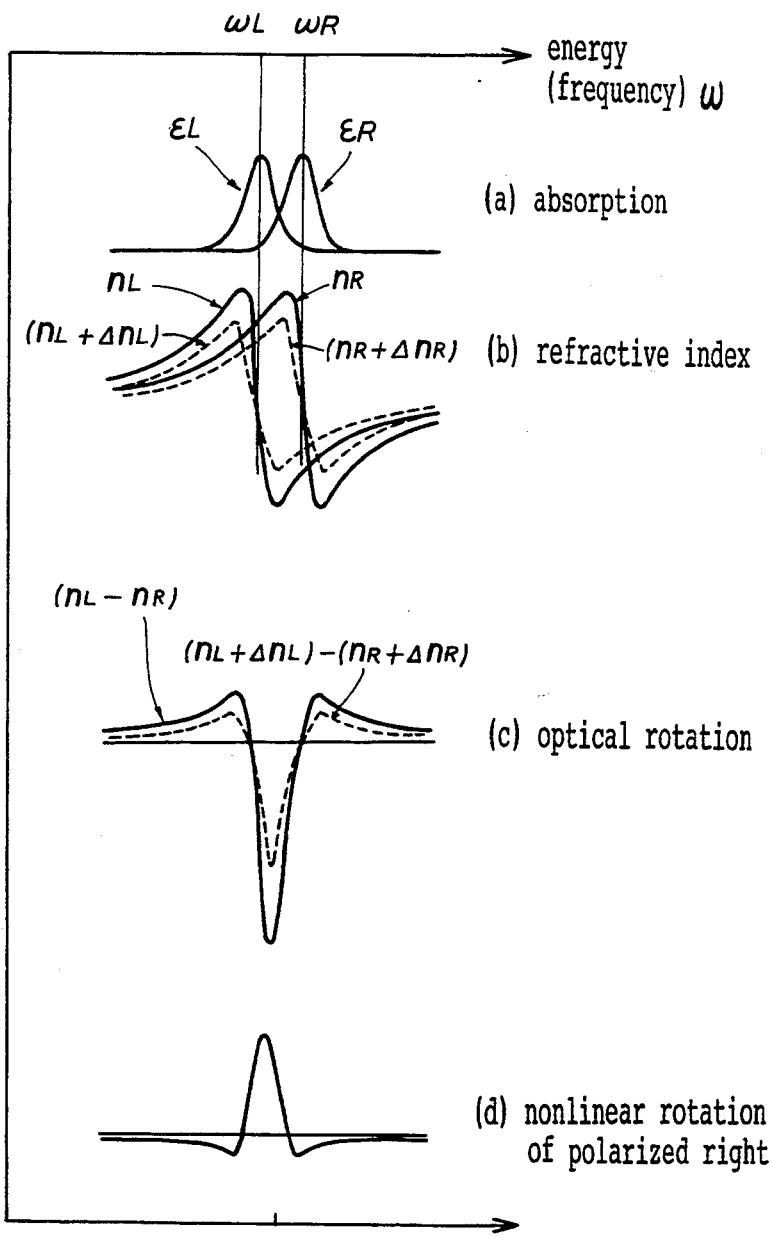
FIG. 4 a diagram showing absorption spectra with respect to the left-handed and right-handed circularly polarized lights, refractive index dispersion, optical rotation and nonlinear rotation of polarized light of a chiral compound.

In this case, as shown in FIGS. 4 (a) and (b) (solid line), for each of the absorption spectrum and the refractive index dispersion, there occurs a difference in the frequency between the lift-handed circularly polarized light and the right-handed circularly polarized light. When the refractive index for the left-handed circularly polarized light and that for the right-handed circularly polarized light are represented by $n_L$ and $n_R$, the optical rotation is caused by $(n_L - n_R)$ as shown in FIG. 4 (c) (solid line), and the angle of rotation of polarization is $\pi l/\lambda(n_L - n_R)$ wherein l is the sample length and $\lambda$ is the wavelength.

When a nonlinear refractive index change occurs due to strong linearly polarized light excitation, since the linearly polarized light is considered to be the sum of the left-handed circularly polarized light and the right-handed circularly polarized light, the excitation acts on both of the $n_L$ and $n_R$ values and the refractive indexes change as shown in FIG. 4 (b) (dotted line).

When the nonlinear refractive index changes are represented by $\Delta n_L$ and $\Delta n_R$, the angle of rotation of polarization derived from the nonlinear effect becomes as follows:

$$\pi l/\lambda[(n_L-n_R)-\{(n_L+\Delta n_L)-(n_R+\Delta n_R)\}]=\pi l/\lambda(\Delta n_L-\Delta n_R)$$

That is, it is conceivable that there occurs rotation of polarized light corresponding to the difference in the nonlinear refractive index changes with respect to the left-handed circularly polarized light and the right-handed circularly polarized light. Further, it is expected that the larger the optical rotation, the larger the above rotation effect.

Therefore, when the chiral compound having a third-order nonlinearity is irradiated with a linearly polarized light, the change in the intensity of the light can be detected as a change in the angle of rotation in the plane of polarization.

When the above characteristics are utilized, measurement can be similarly conducted through the use of the above-described ellipsometric technique even in the case of a linearly polarized light in the same direction as that of the signal without taking into consideration the polarized light as the pumping light, which makes more complicated light signal processing possible.

Further, it is possible to use the pumping light and the signal light in a single linearly polarized light and control the waveform of the signal through the self-rotation derived from the intensity of the light.

Further, the use of a highly repetitive pulse source enables higher sensitivity and accuracy to be ensured through a combination with a high-frequency polarization modulation element.

In the present invention, an optical signal processing unit capable of conducting various optical signal processing can be constructed through a combination of a nonlinear optical device provided with a nonlinear optical element comprising the above-described chiral compound having a third-order nonlinearity with a laser beam source and a photodetector.

In the above-described signal processing unit, the use of the above-described nonlinear optical device enables signal processing, such as signal conversion, optical operation and wave form control, to be readily conducted without any special processing of polarized light, such as conversion to circularly polarized light or change in the angle of polarization, which renders the signal processing unit favorable for use as an optical information element in optical communication and optical information processing.

Although the present invention has been described according to the change in the real part in the refractive index change, it is a matter of course that in the imaginary part as well, the same effect can be attained merely by changing the optical rotation to the elliptic polarization.

EXAMPLES

The present invention will now be described in more detail with reference to the following Examples.

Example 1

A small amount of iodine was added to a solution of 0.2 g/l of 2,7-bis(styryl)naphthalene, and the solution was irradiated with light from a high-pressure mercury lamp for 2 hr and then subjected to silica gel chromatography, and the separated product was recrystallized from benzene/ethanol as a solvent to obtain hexahelicene.

Then, the hexahelicene was subjected to optical resolution by HPLC. The resultant (+)-hexahelicene and (−)-hexahelicene each had an optical purity of 100%.

Figure 5:
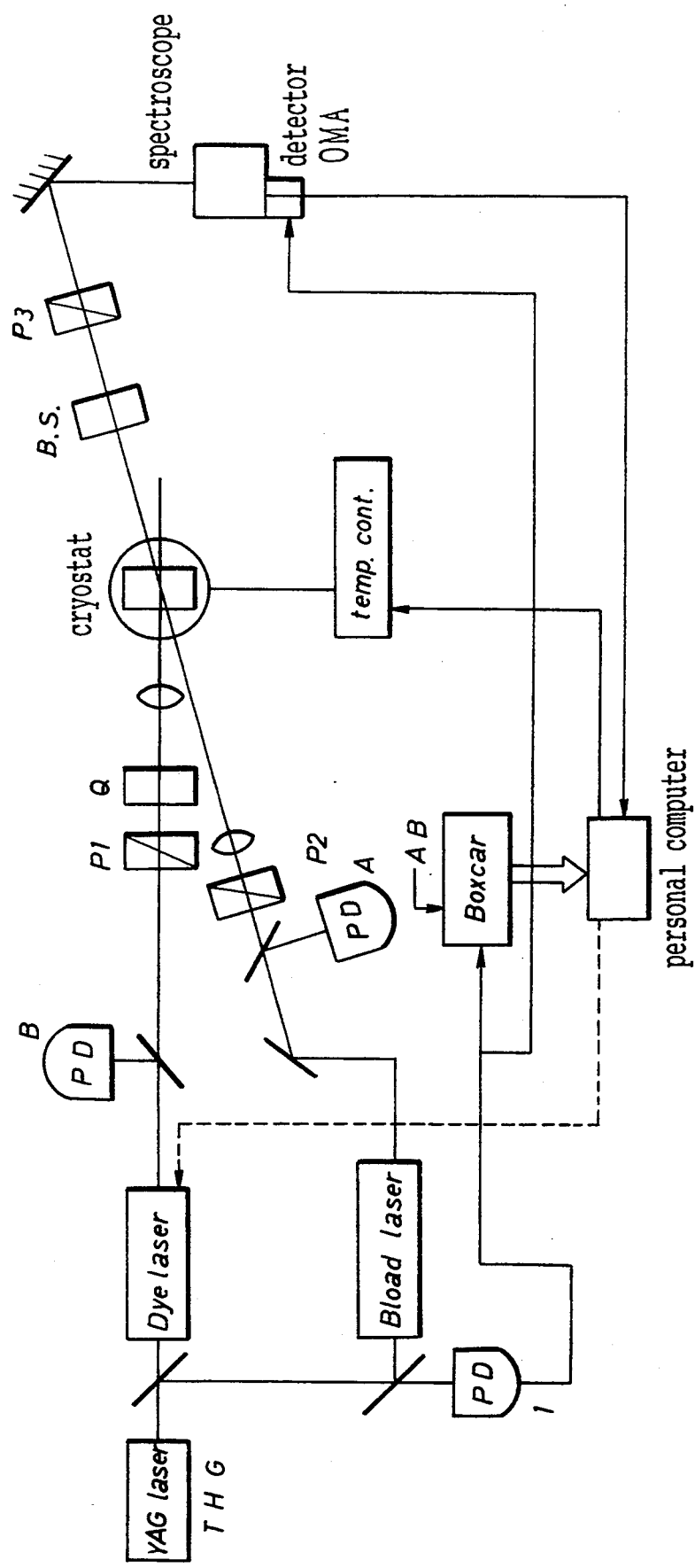
FIG. 5 a schematic view of a nonlinear optical constant measuring unit.

The (+)-hexahelicene was subjected to determination of the chiral nonlinear effect by means of a nonlinear optical constant measuring apparatus shown in FIG. 5.

Signal light was linearly polarized by a polarizer P2, passed through a sample and quenched by an analyzer P3. In this case, the sample was irradiated through a polarizer 1 with a linear polarization pumping light having the same direction of polarization as that of the signal light. As a result, a seeped light derived from the chiral nonlinear effect was detected.

Example 2

The (−)-hexahelicene and (±)-hexahelicene prepared in Example 1 were subjected to determination of the chiral nonlinear effect with a nonlinear optical constant measuring apparatus shown in FIG. 5.

Signal light was linearly polarized by a polarizer P2, passed through a sample and quenched by an analyzer P3. In this case, the sample was irradiated through a polarizer 1 with a linear polarization pumping light having the same direction of polarization as that of the signal light with varied intensities to detect the intensity of an effused light derived° from the chiral nonlinear effect.

Figure 6:
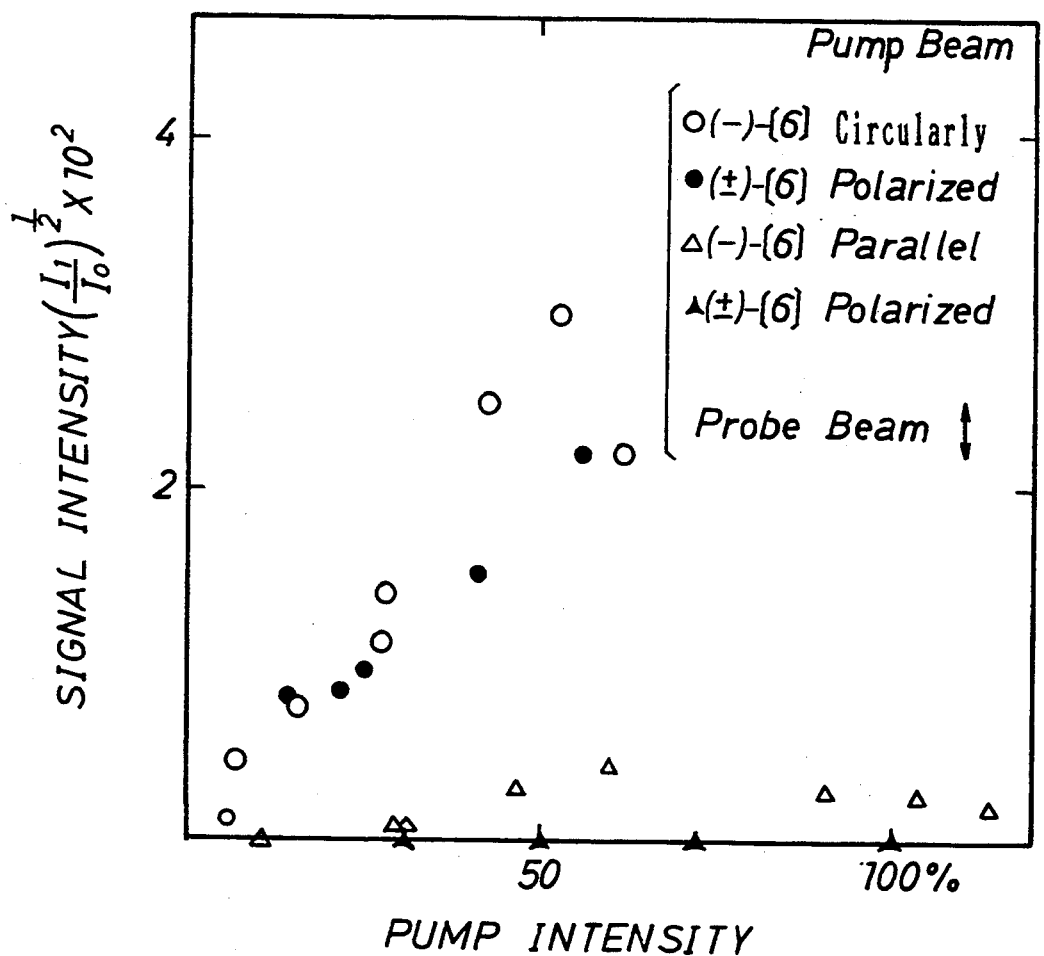
FIG. 6 a graph showing the relationship between the intensity of a linear polarization pumping light and the intensity of a seeped light in Example 2.

The relationship between the intensity of the linear polarization pumping light and the intensity of the effused light is shown in FIG. 6. From the drawing, it is apparent that an effused light is detected in the case of (−)-hexahelicene while no effused light is detected in the case of (±)-hexahelicene.

For reference, the results of the determination on the nonlinear effect by circular polarization pumping light are shown in FIG. 6.

Example 3

Figure 7:
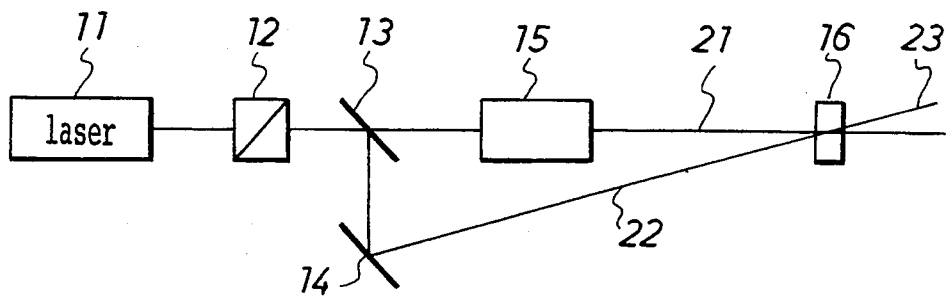
FIG. 7 a schematic view of an optical signal processing unit for converting the intensity of the signal light to the angle of polarization.

An optical signal processing unit for converting the intensity of the signal light to the angle of rotation is shown in FIG. 7.

Numeral 11 designates a laser light source, numeral 12 a polarizer for converting the light to linearly polarized light, numeral 13 a beam splitter for dividing the laser beam, numeral 14 a mirror, numeral 15 a light intensity modulator, and numeral 16 a nonlinear optical device of the present invention.

The light emitted from the laser light source 11 is linearly polarized by the polarizer 12. When the light from the laser light source 11 is a satisfactory linearly polarized light, it is not necessary to provide the polarizer 12. The linearly polarized light is split into two beams by the beam splitter 13. The light passed through the beam splitter 13 is subjected to intensity modulation by the light intensity modulator 15 to produce a pumping light 21 and enter the nonlinear optical device 16.

On the other hand, a signal light 22 reflected by the beam splitter 13 and subjected to a change in the optical path by a mirror 14 enters the nonlinear optical device 16. In this case, it is desired that the signal light 22 have an intensity sufficiently lower than that of the pumping light. The signal light 22 in the form of a light 23 wherein the direction of polarization has been rotated can be taken out through the action of the nonlinear optical device 16 according to the signal intensity of the pumping light 21.

Example 4

Figure 8:
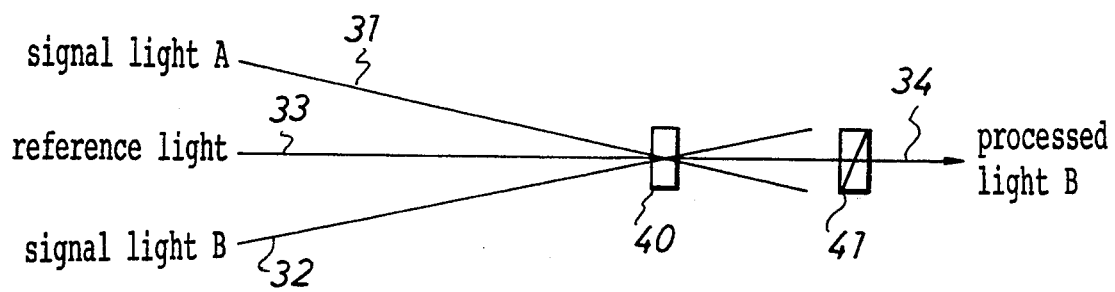
FIG. 8 a schematic view of an optical signal processing unit for AND processing.

An optical signal processing unit for conducting AND processing is shown in FIG. 8.

A signal light A31, a signal light B32 and a reference light 33 are all a linearly polarized light having the same direction of polarization, and the signal light A and the signal light B change digitally.

Numeral 40 designates a nonlinear optical device and numeral 41 an analyzer which is set in such a direction as to quench the reference light 33 in the absence of the signal light A and signal light B.

An output light 34 is a light passed through the analyzer 41 and may be thought to be substantially zero when the signal light A and signal light B are zero. When the intensity of the output light 34, that of the signal light A, that of the signal light B and that of the reference light are represented by $I_{OUT}$, $I_A$, $I_B$ and $I_P$, respectively, $$I_{OUT} \propto \sin^2(I_A+I_B)\cdot I_P$$

and in the vicinity of the angle of quenching, $$I_{OUT} \propto (I_A+I_B)^2 \cdot I_P$$

Therefore, when both A and B are ON, the intensity of the output light becomes four times that in the case where one of them is ON.

Thus, a very large $T_{OUT}$ value can be obtained when both $I_A$ and $I_B$ are 1, and AND processing becomes possible by setting a proper threshold value.

Figure 9:
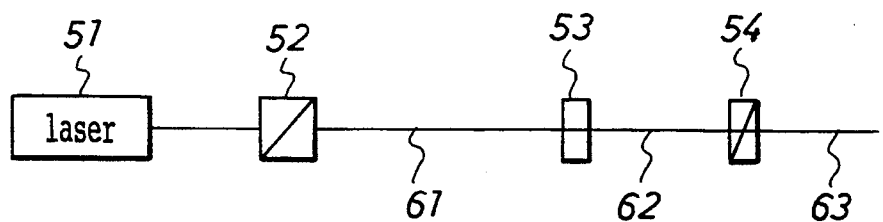
FIG. 9 is a schematic view of an optical signal processing unit for controlling the waveform.

Further, it is also possible to further clarify a digital signal through a combination of the optical signal processing unit with a waveform controller as shown in FIG. 9 wherein use is made of a self-rotation effect.

Example 5

An optical signal processing unit for controlling the waveform is shown in FIG. 9.

Numeral 51 designates a laser light source and numeral 52 a polarizer which is unnecessary when the light from the laser light source 51 is in a satisfactorily linearly polarized state. Numeral 53 designates a nonlinear optical device, and numeral 54 an analyzer which is set so as to be brought to a quenched state when an incident light 61 is sufficiently weak.

The light from the laser light source 51 is converted by the analyzer 52 to a linearly polarized incident light 61 which enters the nonlinear optical device 53. The light passed through the nonlinear optical device brings about rotation of the polarized light to an extent proportional to the intensity $I_{in}$ of the incident light. Therefore, the intensity $I_{out}$ of the output light 63 detected after passing through the analyzer 54 is as follows:

$$I_{OUT} \propto I_{in} \cdot \sin^2\theta,$$

wherein $\theta$ is angle of rotation of polarized light and proportional to the intensity of the light, and in the vicinity of the angle of quenching, $$I_{OUT} \propto I_{in} \cdot I_{in}^2 = I_{in}^3$$

This enables a small change to be detected as a large change, so that it becomes possible to control the waveform.

For example, a signal wave $\sin^2\omega t$ wherein $\omega << \omega_0$ (wherein $\omega_0$ is an angular frequency of light) is input, the output signal is a signal having an intensity proportional to the $\sin^6\omega t$ and exhibits a very sharp rise.

Further, it is also possible to further clarify a digital processing through a combination of the optical signal processing unit with the processing unit described in Example 4.

What is claimed is:

1. A nonlinear optical device which comprises
   (a) a nonlinear optical element comprising a chiral compound having a third-order nonlinearity and exhibiting a chiral nonlinear effect, an input signal of said nonlinear optical element being a single linearly polarized light or two or more linearly polarized lights having the same direction of polarization and an output signal of said nonlinear optical element being a change in a nonlinear angle of rotation in a plane of polarization of said linearly polarized light and
   (b) an analyzer for reading the change of the nonlinear angle of rotation.

2. An optical signal processing unit comprising:
   (a) a laser light source which outputs a single linearly polarized light or two or more linearly polarized lights having the same direction of polarization,
   (b) a nonlinear optical device coupled to receive the output of said laser light source, said nonlinear optical device including a nonlinear optical element, the nonlinear optical element comprising a chiral compound having a third-order nonlinearity and exhibiting a chiral nonlinear effect, an output signal of said nonlinear optical device being a change in a nonlinear angle of rotation in a plane of polarization of said linearly polarized light which is received from said laser light source,
   (c) a photodetector for detecting the output signal, and
   (d) an analyzer for reading the change of the nonlinear angle of rotation.

3. The nonlinear optical device according to claim 1, wherein the chiral compound is an exciton compound selected from the group consisting of (6R,15R)-(+)-6,15-dihydro-6,15-ethanonaptho[2,3-c]pentaphene; 13,13'-spirobi[13H-indeno[1,2-b]anthracene; and 1,1'-bianthryl compounds.

4. The nonlinear optical device according to claim 1, wherein the chiral compound is (+)-hexahelicene or (−)-hexahelicene.

5. The optical signal processing unit according to claim 2, wherein the chiral compound has a condensed aromatic ring.

6. The optical signal processing unit according to claim 2, wherein the chiral compound is an optically active helicene compound.

7. The optical signal processing unit according to claim 6, wherein the optically active helicene compound is a carbohelicene.

8. The optical signal processing unit according to claim 6, wherein the optically active helicene compound is a heterohelicene.

9. The optical signal processing unit according to claim 2, wherein the chiral compound is an exciton chiral compound.

10. The optical signal processing unit according to claim 9, wherein the chiral compound is an exciton compound selected from the group consisting of (6R,15R)-(+)-6,15-dihydro-6,15-ethanonaptho[2,3-c]pentaphene; 13,13'-spirobi[13H-indeno[1,2-b]anthracene; and 1,1'-bianthryl compounds.

11. Thee optical signal processing unit according to claim 2, wherein the chiral compound is (+)-hexahelicene.

12. The nonlinear optical device according to claim 1, wherein the chiral compound is a carbohelicene of 6 to 20 aromatic rings linked to each other.

13. The nonlinear optical device according to claim 1, wherein the chiral compound is a heterohelicene of rings formed by cocondensation of benzene with a heterocycle selected from the group consisting of thiophene, furan, pyridine and pyrrole, linked to each other.

* * * * *